H. W. CLELAND.
SPRING MOTOR.
APPLICATION FILED MAY 23, 1905.

1,015,298.

Patented Jan. 23, 1912.
2 SHEETS—SHEET 1.

WITNESSES
Warren W. Swartz
R A Balderson

INVENTOR
H. W. Cleland
by Bakewell & Byrnes
his attys

H. W. CLELAND.
SPRING MOTOR.
APPLICATION FILED MAY 23, 1905.

1,015,298.

Patented Jan. 23, 1912.
2 SHEETS—SHEET 2.

WITNESSES
Warren W. Swartz
R A Balderson

INVENTOR
H. W. Cleland
by Bakewell & Byrnes
his attys

UNITED STATES PATENT OFFICE.

HARRY W. CLELAND, OF WILKINSBURG, PENNSYLVANIA, ASSIGNOR TO G. BREWER GRIFFIN, OF EDGEWOOD PARK, PENNSYLVANIA.

SPRING-MOTOR.

1,015,298.    Specification of Letters Patent.    Patented Jan. 23, 1912.

Application filed May 23, 1905. Serial No. 261,858.

*To all whom it may concern:*

Be it known that I, HARRY W. CLELAND, of Wilkinsburg, Allegheny county, Pennsylvania, have invented new and useful Improvements in Spring-Motors, of which the following is a full, clear, and exact description, reference being had to the accompanying drawings, forming part of this specification, in which—

Figure 1:
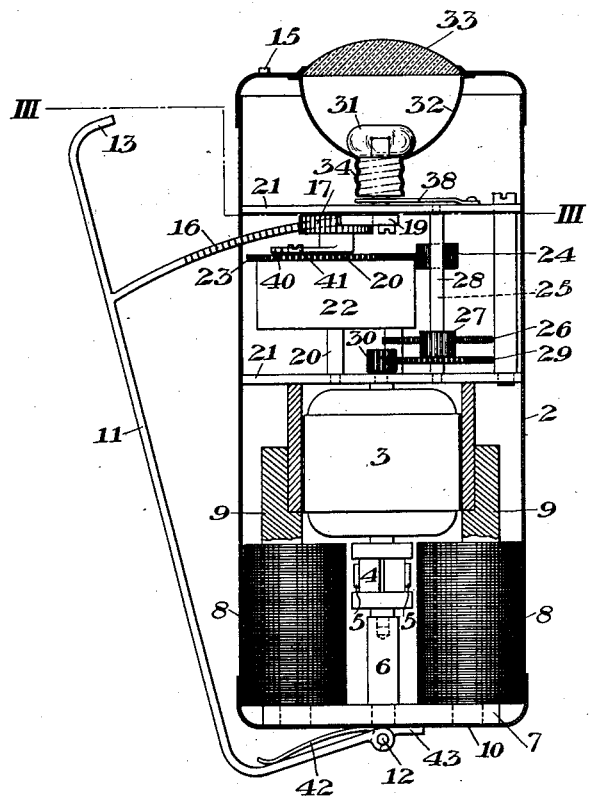
Figure 2:
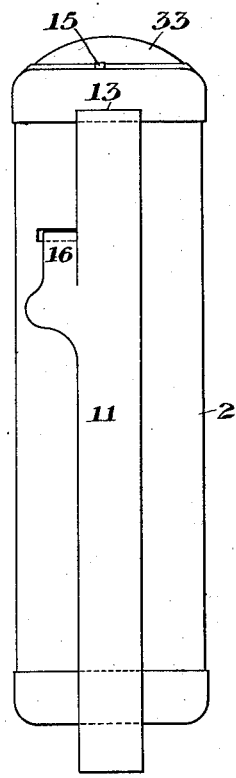
Figure 3:
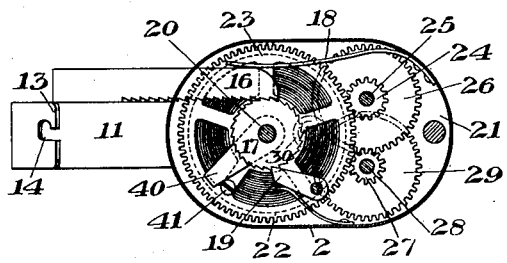
Figure 4:
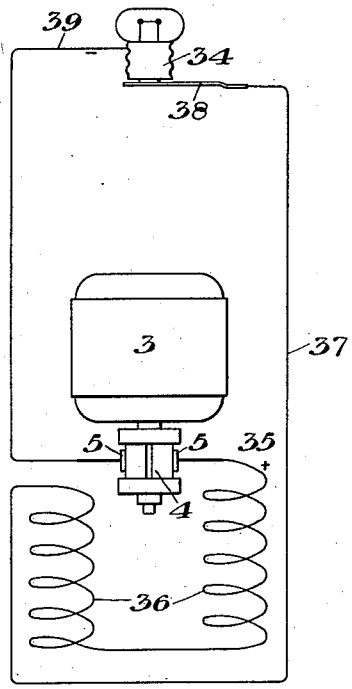
Figure 5:
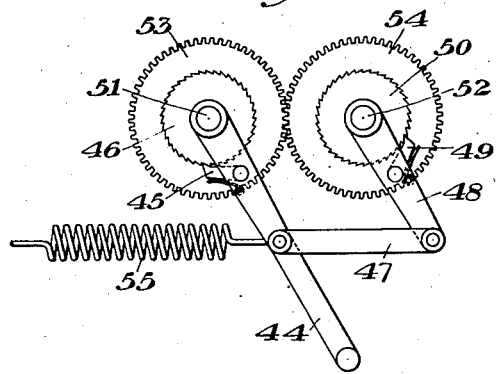

Figure 1 is a sectional side-elevation of a motor embodying my invention applied to an electric lamp; Fig. 2 is a side elevation; Fig. 3 is a cross-section on the line III—III of Fig. 1; Fig. 4 is a diagrammatic view of the wiring; and Fig. 5 is a detail view showing a modified form of driving connection.

My invention has relation to spring motors, and has been more particularly designed to provide a motor which is adapted to operate a generator for supplying electric current to portable electric lamps. It has been customary in this class of lamps, as heretofore made, to supply the current by a small battery located in the lamp casing. These batteries, of course, last only a short time and are liable to deteriorate rapidly, requiring frequent replacing. My invention is designed to overcome these difficulties, and thereby make possible a hand lamp to which the current is supplied by a small generator located within the lamp casing and driven by a motor in the casing or by a hand attachment or both.

The invention also consists in so arranging the motor that it will form a part of the connections between the hand lever of the gearing actuated thereby and the generator.

It also consists in so arranging the spring motor that it will serve to drive the generator at a practical constant rate of speed, while at the same time the hand lever or hand device operates to wind up the spring.

The invention further consists in the construction and arrangement of parts as hereinafter more fully described and claimed.

In the drawings 2 represents the casing which may be of oblong form in cross-section as shown or of circular form or any other desired shape. Within this casing is mounted a small electric generator 3 of which the commutator is indicated at 4 and the commutator brushes at 5, 5.

6 is the lower bearing for the generator shaft which bearing is preferably secured to or formed as a part of the yoke base 7 of the field magnet 8.

9, 9 represent the cores of the field. The bearing 6 is preferably non-magnetic material.

I preferably arrange the end portion 10 of the casing so that it is detachable, and may be pulled off to give access to the interior parts.

The hand lever 11 for operating the spring and thereby the generator is shown as pivoted to the part 10 at 12, the top end of this lever being preferably bent as shown at 13 and provided with a hook-shaped recess 14 which may be engaged with a short pin 15 on the upper end of the casing to hold the lever in closed position when in the pocket. From the intermediate part of this hand lever projects the ratchet bar 16 having suitable ratchet teeth engaging a ratchet wheel 17. The teeth of this ratchet are normally held in engagement with the ratchet wheel by a leaf spring 18 bearing against the edge of the ratchet or rack bar. The ratchet wheel is prevented from rotating rearwardly by means of a spring-pressed pawl 19 engaging its teeth. This ratchet wheel is secured to a shaft 20 which is mounted in suitable bearings in the frame 21 of the driving mechanism. Loosely surrounding the shaft 20 is a spring barrel 22 containing a coil spring, one end of which is secured to the shaft 20, while the other and outer end is secured to the spring barrel. This spring barrel is provided with a toothed gear wheel 23 which intermeshes with a pinion 24 on a shaft 25 having a large toothed wheel 26 which engages a small pinion 27 on a short parallel shaft 28. A toothed wheel 29 is secured to the shaft 28 and engages a pinion 30 secured to the generator shaft.

The lamp 31 may be constructed in any suitable manner, and I have shown it as mounted in a conical casing 32 having a lens 33, the casing forming a reflector. The lamp is screwed into the socket 34 formed by the base portion of the reflector, the parts being suitably screw-threaded for this purpose.

The electrical connections are diagrammatically shown in Fig. 4, thus the positive wire 35 leads from one of the commutator brushes through the field coils 36 and the wire 37 to the spring 38 which contacts with the plug containing the center lead-in wire. The negative wire 39 leads back from the screw plug casing to the other brush and the commutator.

If the casing of the apparatus is of non-conducting material, the wire 37 would lead to the frame of the apparatus and the current would pass through the frame to the spring 38. If the casing is of conducting material, the spring 38 will be insulated from the case, and wires will be employed as shown.

Secured to the shaft 20 is a fixed arm 40 which is arranged to engage a screw 41 secured to the spring barrel, preferably to the gear wheel part 23 thereof. The screw acts as a stop to prevent movement of the arm in one direction except as the top is turned. This stop is so arranged that when the hand lever is operated it will tend to move the arm away from the stop.

The spring in the spring barrel is wound up to an initial tension at the factory, which tension is balanced by the pressure of the stop against the stop arm when not in operation. When the operator rapidly reciprocates the hand lever he will move the stop arm away from the stop and if this reciprocation is continuously carried on the spring in the barrel will continuously rotate the generator, while at the same time the spring is being wound up by the movements of the ratchet wheel. The screw is made accessible either by boring a hole through the gearing frame or in any other desirable manner, so that it may be removed and the spring wound up to the desired tension, after which the screw is inserted so as to bear against the stop arm. In the form shown the hand lever is returned by a spring 42 and the lever is preferably provided with a stop 43 which limits its outward movement.

In the use of the device the operator will unlatch the hand lever and then by gripping the lever and case will rapidly reciprocate the ratchet or rack bar and thereby move the stop lever away from the stop screw. As long as he keeps the lever ahead of the screw the spring will act to give the generator a practical uniform rotation, thus supplying the current to the lamp and keeping it lighted at substantially the same pressure. If this reciprocation is stopped the screw again engages the stop lever and the movement of the parts gradually slows down and stops.

By making the stop removable I can adjust the tension of each individual lamp according to the individual characteristics of its motor, lamp and driving spring. This is important since if the parts are to be made in exactly the same manner there are individual characteristics which will necessitate the proportioning of the tension for each lamp.

The hand driving device may of course be varied in many different ways, thus I show in Fig. 5 a driving mechanism adapted to impart movement to the spring shaft on both movements of the lever. In this case 44 represents a hand lever or a lever connected to a hand device. This lever is shown as provided with a spring-pressed pawl 45 engaging the ratchet wheel 46. A pivotal link 47 connects the lever 44 with a lever 48 having a similar spring-pressed pawl 49 engaging a ratchet wheel 50. The ratchet wheels 46 and 50 are secured to shafts 51 and 52 on which shafts are secured the gear wheels 53 and 54 which intermesh with each other. A spring 55 is adapted to return the hand lever. In this case one pawl will move its ratchet as the hand lever moves in one direction while the other pawl will actuate its ratchet as the hand lever moves in the opposite direction. In this case the returning spring 55 must of course be strong enough to overcome the resistance and exert a driving force upon the shaft of the spring barrel as well as returning the parts. In this case the spring is preferably made adjustable, so that its tension may be varied if desired.

The advantages of my invention will be apparent to those skilled in the art.

These hand or pocket electric lamps have proven useful for many purposes, but have been objectionable on account of their being sensitive to dampness and needing frequent replacing of the battery. By my invention these difficulties are overcome, and the device is always ready for use.

The initial tension motor is an important feature of the invention, since in order to give a steady light it is important that the generator should be driven at a fairly constant rate of speed. This would be practically impossible with any direct connection between the hand device and the generator. By using the motor having this initial tension I can further adjust the tension of the motor according to the resistance in the circuit and thereby obtain a good and fairly uniform light from each lamp. This insures a fairly steady light under one or two actions of the hand lever so long as it is reciprocated in such a manner as to keep the stop lever out of engagement with the stop, without of course moving it so rapidly as to carry it around to the other side of the stop. The generator may be of any well known type and may be either of the magnetic type with permanent field magnets, or of the ordinary self exciting type. It is of course constructed so as to be light and compact.

The hand driving device may be changed, the type of initial tension motor may be varied, and many other changes may be made in the form and arrangement of the parts without departing from my invention, since I consider myself the first to combine in portable form a hand driving device with an electric generator and lamp.

I claim:—

1. A spring motor having a hand-operated device for winding the spring, and means for preventing the spring from acting except while the hand-operated device is being actuated and thereby maintain the spring under an initial tension, substantially as described.

2. A spring motor having actuating connections for winding the spring, manual means for actuating said connections, and a connection between said manual means and the spring, whereby the spring will exert a driving action only when the manual means is being operated and thereby maintain the spring under an initial tension, substantially as described.

3. A spring motor comprising a shaft, a spring barrel loosely mounted on said shaft, a spring connecting the shaft and barrel, connections for actuating the shaft to wind the spring, and a stop connection between the barrel and said shaft acting to hold the barrel against rotating except when the actuating connections are in motion and thereby maintain the spring under initial tension, substantially as described.

4. A spring motor comprising a shaft, a spring barrel loosely mounted on said shaft, a spring connecting the barrel and shaft, a gear wheel carried by the barrel and having a stop projection, an arm secured to said shaft and adapted to engage the stop projection, and connections for actuating said shaft, substantially as described.

5. A spring motor comprising a gear to be driven, a spring barrel connected to said gear, a shaft on which the spring barrel is loosely mounted, a ratchet wheel connected to said shaft, a spring within the barrel and connecting the barrel and shaft, and a stop between the spring barrel and the shaft arranged to maintain the spring under an initial tension, substantially as described.

6. A spring motor comprising a gear to be driven, a spring barrel connected to said gear, a shaft on which the barrel is loosely mounted, a spring connecting the barrel and shaft, a ratchet wheel on the shaft, and a pivoted lever connected to the outside of the casing and having a rack projecting into the casing and having a plurality of teeth beveled in one direction arranged to engage the teeth of the ratchet wheel when moving in one direction to wind up the spring, substantially as described.

7. A spring motor comprising a gear to be driven, a spring barrel connected to said gear, a shaft on which the barrel is loosely mounted, a spring connecting the barrel and shaft, a ratchet wheel on the shaft, and a pivoted lever connected to the outside of the casing and having an extension projecting into the casing arranged to actuate the ratchet wheel to wind up the spring, together with a connection between the barrel and the shaft arranged to maintain the spring under an initial tension, substantially as described.

In testimony whereof, I have hereunto set my hand.

HARRY W. CLELAND.

Witnesses:
 JOHN MILLER,
 H. M. CORWIN.